UNITED STATES PATENT OFFICE.

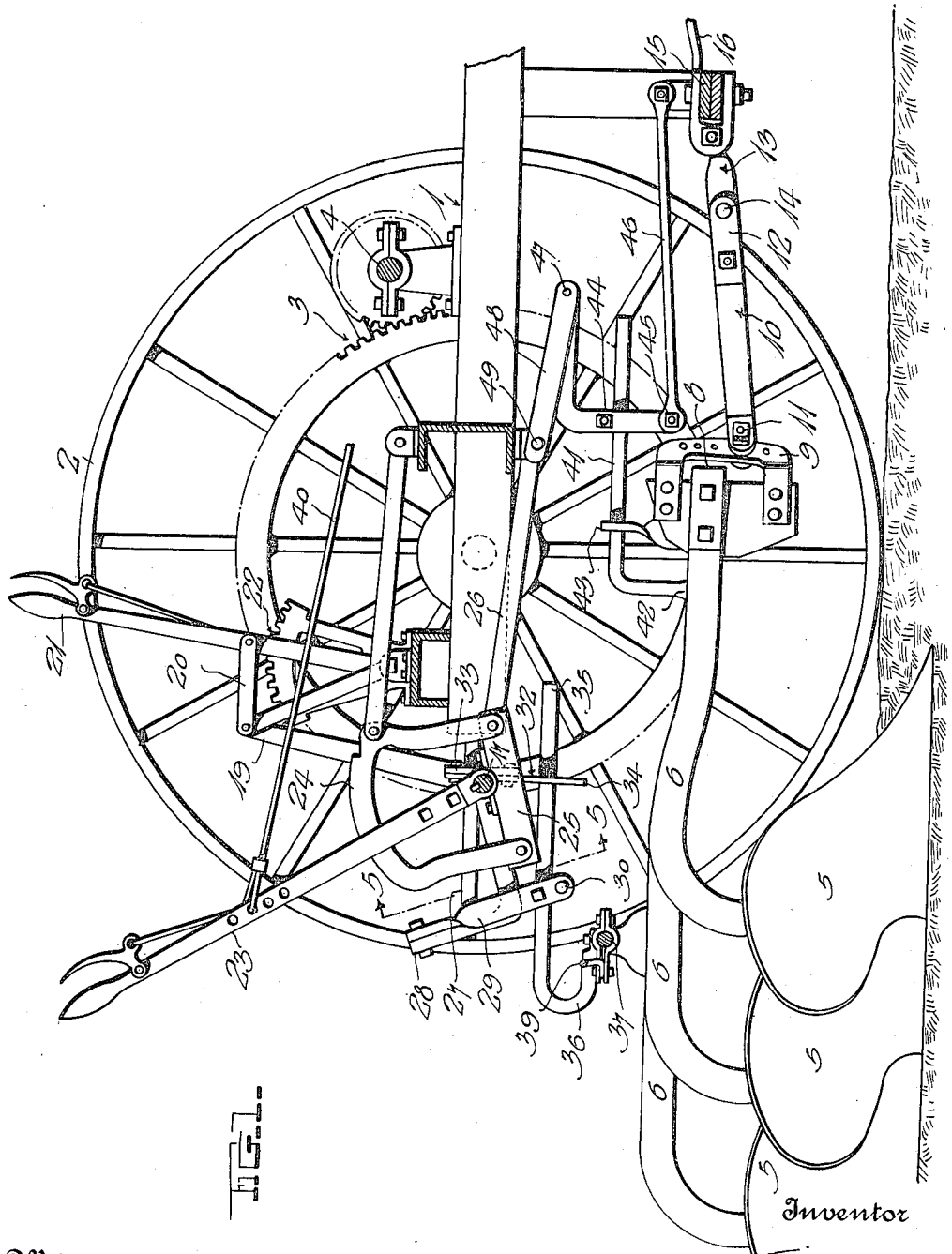

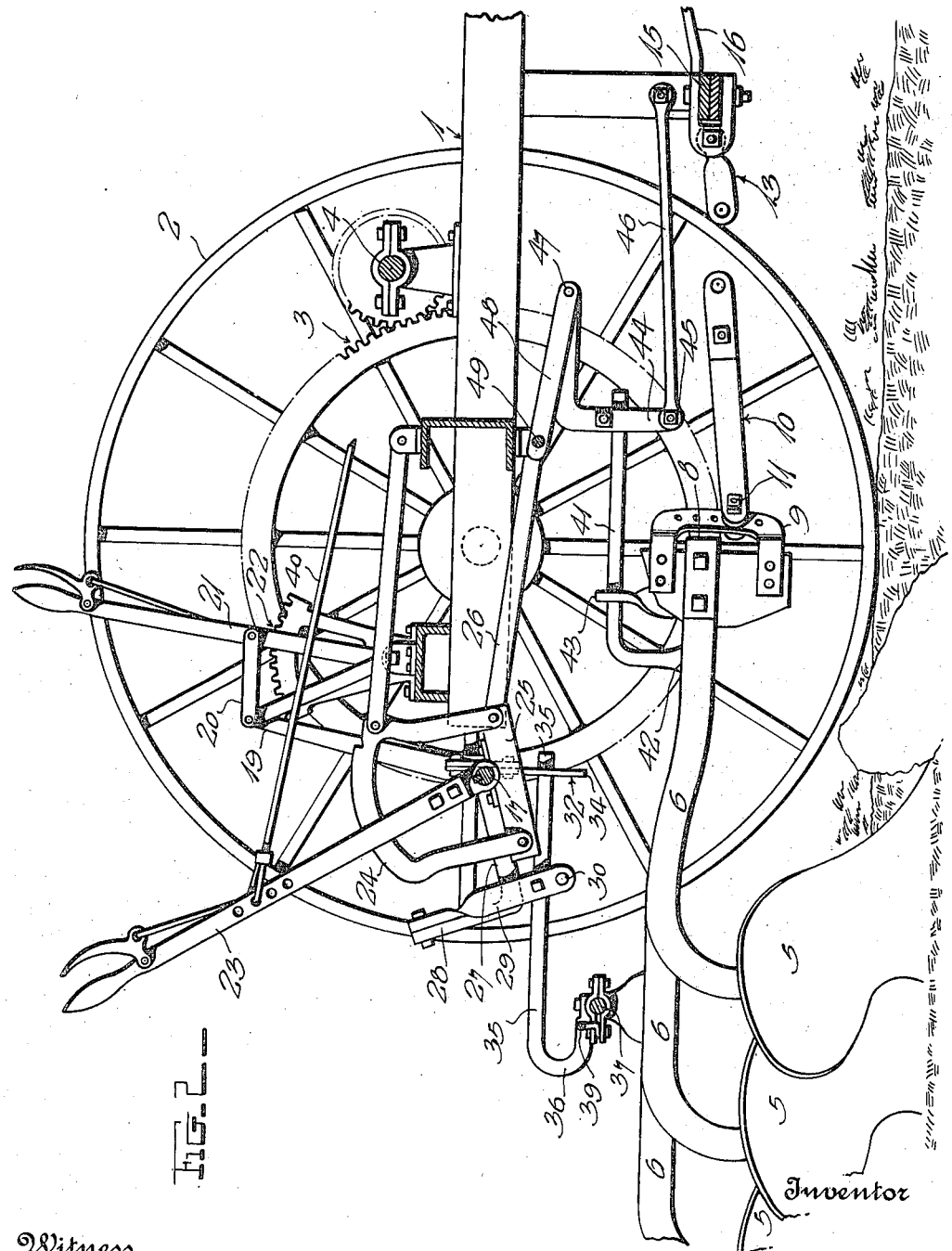

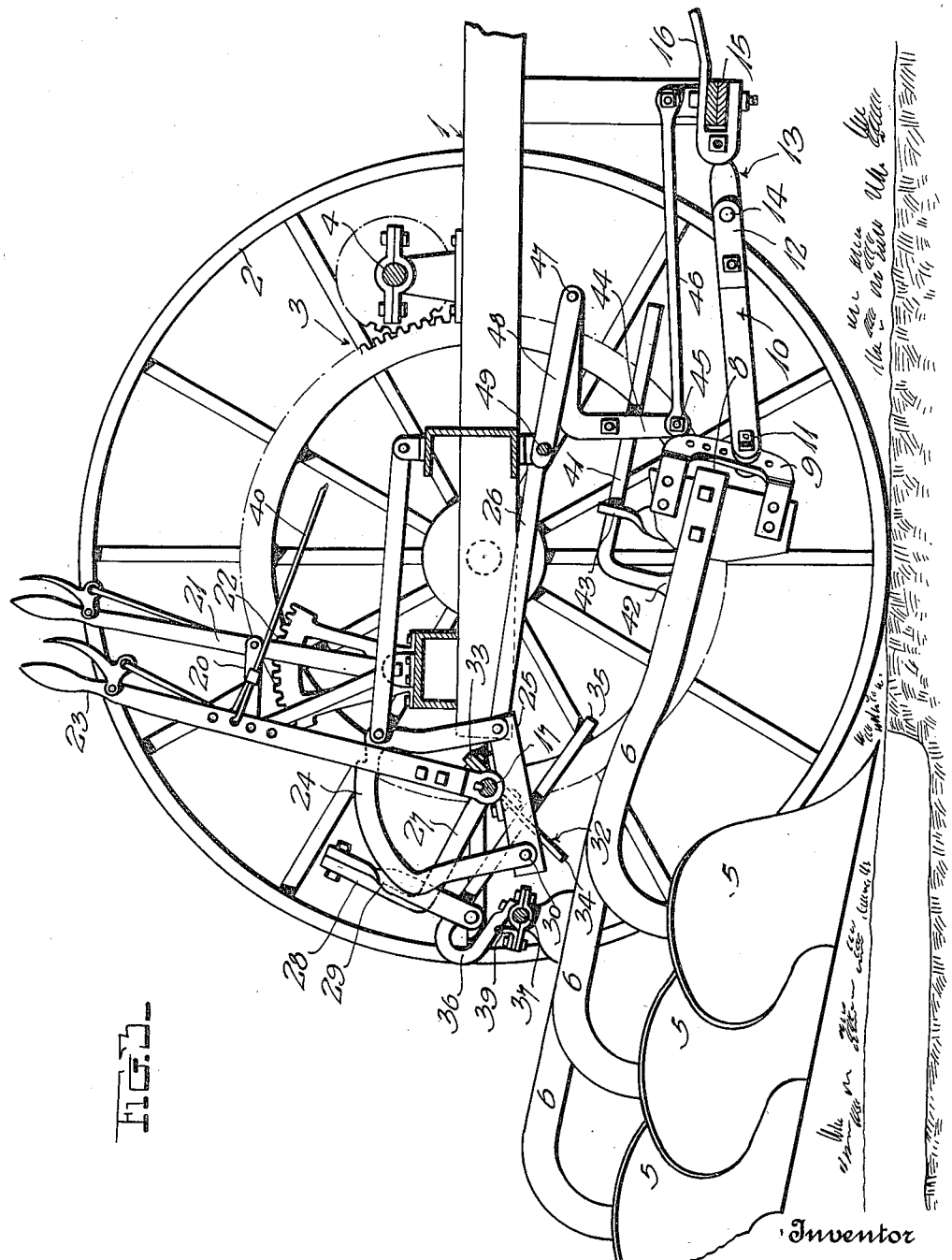

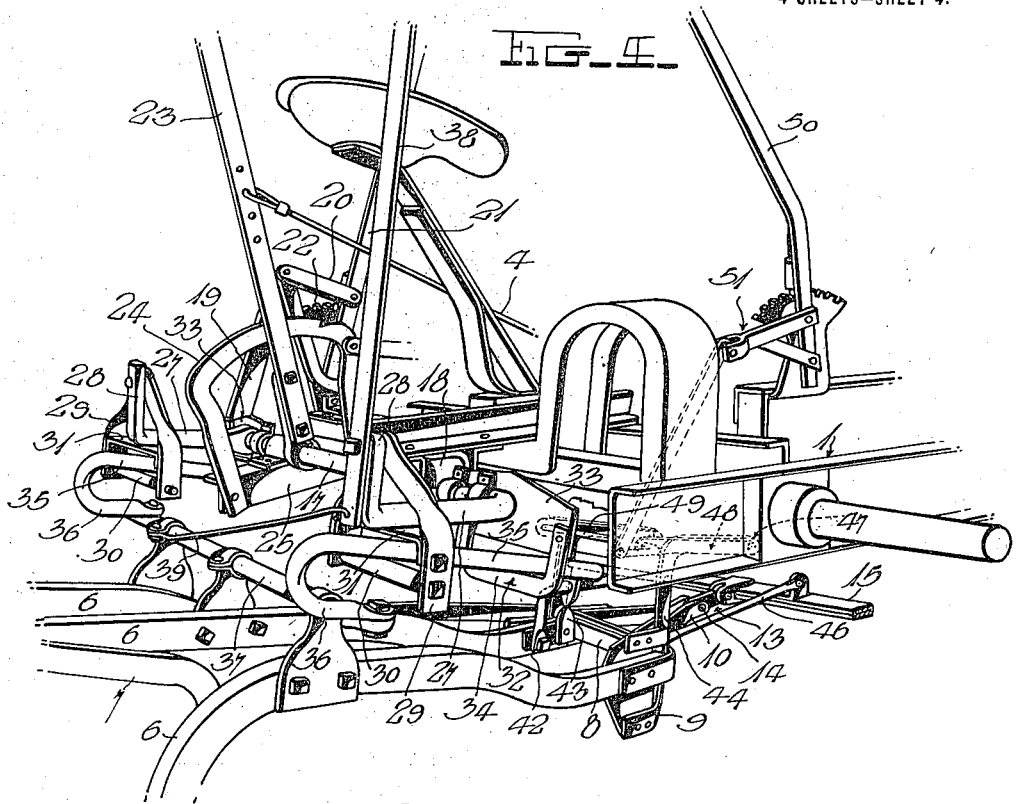
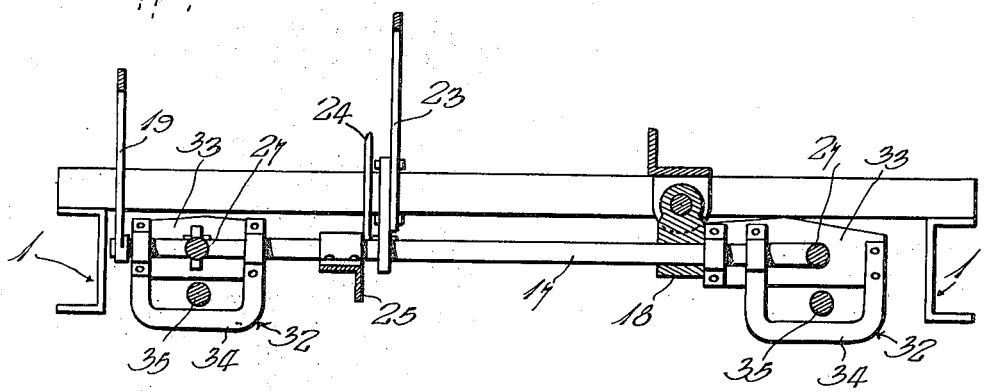

JOHN NATTERSTADE, OF SIOUX CITY, IOWA.

PLOW.

1,293,876.      Specification of Letters Patent.      Patented Feb. 11, 1919.

Application filed July 1, 1918. Serial No. 242,786.

*To all whom it may concern:*

Be it known that I, JOHN NATTERSTADE, a citizen of the United States, residing at Sioux City, in the county of Woodbury and State of Iowa, have invented certain new and useful Improvements in Plows; and I do declare the following to be a full, clear, and exact description of the invention, such as will enable others skilled in the art to which it appertains to make and use the same.

My invention has for one object to provide a plow in which novel provision is made for disconnecting the plows from the carrying frame thereof when a rock, stump, or other obstruction is encountered, thus preventing breakage of any parts except the frangible connection provided.

In carrying out the above object, a further aim is to provide effective means for retaining the plow beams and frame in proper relation until the frangible connection is broken, said retaining means being then slidable freely from engagement with the beams.

Still further objects are the provision of means for adjusting the retaining means vertically to similarly adjust the plow beams, and means for adjusting said beams laterally with respect to the frame and retaining means.

Yet another object is to provide for tilting the gang of plows laterally whenever desired, by similarly tilting the transverse rock shaft on the frame which carries the retaining means for the rear portions of the beams.

With the foregoing objects in view, the invention resides in the novel features of construction and unique combinations of parts to be hereinafter fully described and claimed, the descriptive matter being supplemented by the accompanying drawings which form a part of this application and in which:

Figure 1 is a longitudinal section of the machine showing the plows lowered for use;

Fig. 2 is a similar view showing the manner in which the plows are disconnected from the frame when a rock or the like is encountered;

Fig. 3 is a longitudinal section showing the plows in raised position;

Fig. 4 is a perspective view of part of the machine; and

Fig. 5 is a detail transverse section on the plane of the line 5—5 of Fig. 1.

In the drawings above briefly described, the numeral 1 designates a tractor frame supported at its rear end on traction wheels 2 driven by gearing 3 from a differential shaft 4, said shaft being rotated by any suitable motor not shown, this driving means being preferable although any other could well be employed.

A gang of plows 5 have their forwardly extending beams 6 suitably braced together as indicated for instance at 7, the front ends of said beams being connected by transverse bars or the like 8. Clevises 9 are carried by the front ends of the beams 6 and the rear ends of fork arms 10 are adjustably connected at 11 to said clevises, the shank 12 of said fork arms being connected by suitable means 13 including a frangible pin 14, with a frame 15 which depends from the frame 1 and is suitably braced at 16. The pin 14 is preferably formed of wood and it is intended that when an obstruction is encountered by the plows, this pin shall break, thus permitting the plows to remain in lodged position, while the frame travels forwardly therefrom, thus preventing breakage of any parts except the pin in question. For adjusting the plows as required and for holding them in proper operative position in respect to the frame 1 under normal conditions, and to permit free forward movement of the frame from the plows when the frangible pin is broken, the arrangement of parts now to be described is provided.

A transverse rock shaft 17 is located at the rear end of frame 1 and as depicted most clearly in Fig. 5, one end of said shaft is supported by a tilting bearing 18. A link 19 rises from the other end of shaft 17 to a crank arm 20 on a lever 21 which is fulcrumed to the frame 1, said lever having suitable dog and rack means 22 for holding it in adjusted position. By the means yet to be set forth, the several plow beams 6 are connected with the shaft 17, and it will therefore be obvious that by adjusting lever 21 and raising and lowering one end of said shaft, the gang of plows may be tilted laterally whenever necessary. Shaft 17 is provided with a lever 23 whereby it may be rocked to raise and lower the plows as hereinafter described and to hold said lever when the plows are raised (see Fig. 3) a dog and a suitable rack 24 are provided, said rack being mounted on a cross arm 25 carried by the shaft 17. A link 26 extends forwardly from the arm 25 and is anchored to a suitable part of the frame 1, to prevent rearward movement of the end of shaft 17 remote from the bearing 18.

The ends of shaft 17 are provided with rearwardly extending crank arms 27 having upwardly directed rear ends 28 to which open guide frames 29 are secured, said frames including transverse rollers 30 and rods or the like 31 spaced above them. Other guide frames 32 are spaced in advance of the frames 29 and preferably consist of plates 33 secured to shaft 17, and U-shaped bars 34 secured at their ends to and depending from said plates. Longitudinal arms 35 with which the plow beams 6 are provided, extend forwardly through the guide frames 29 and 32 and are anchored only at their rear ends, the front ends of said arms being free and unobstructed to permit forward sliding of the frames therefrom when the pin 14 is severed. The anchoring means for the rear ends of arms 35 may be in any preferred form, but I prefer to bend said ends downwardly and forwardly at 36 and secure them to a transverse shaft 37 mounted on the beam.

By operating the lever 23, it will be obvious that the crank arms 27 are actuated to raise the frames 32—29, thus raising the plows out of the ground as seen in Fig. 3, and in order that the plow beams may be swung laterally whenever required, for instance when plowing on a side hill, I fulcrum a lever 38 to the upturned end 28 of one of said crank arms, and extend a rod 39 from the lower end of said lever to one of the bearings of the shaft 37, or to any other preferred point. If desired, a cable or the like 40 may extend forwardly from lever 23 to a suitable device (not shown) driven from the differential shaft 4, for operating said lever under power to raise the plows. It may here also be stated that when lever 38 is operated to adjust the gang of plows laterally, the arms 35 shift in the guide frames 29 and 32, said frames being of sufficient width to allow all movement necessary.

Additional arms 41 are located at the front ends of the beams 6, the rear ends of said arms being secured at 42 and braced at 43, while the projecting front portions of said arms are slidably received in an open guide frame 44 of inverted L-shape, the lower end of said frame 44 being pivoted at 45 to a longitudinal link 46 which is also pivoted to the frame 15, while at 47, the upper end of the frame 44 is pivoted to crank arms 48 extending forwardly from the transverse rock shaft 49 which may be rocked at will by means of a lever 50 and suitable operating connections 51. The operation of shaft 49 will cause the crank arm 48 to raise or lower the frame 44 as occasion may demand, and it may here be stated that this frame is centrally disposed, so that lateral tilting of the shaft 17 and the gang of plows will cause the front arm 41 to act as a pivot.

In operation, the machine is propelled along the field, the plows being suitably adjusted by means of the several levers, to meet the conditions encountered. Under ordinary circumstances, the pin 14 resists the pull of the plows, but when large rocks, stumps or the like are struck by the plows, the pin 14 will break and the tractor will then travel forwardly from the plows as illustrated in Fig. 2, the several guide frames then sliding from the arms 35 and 41. There is thus no danger of breaking any parts of the plows or tractor, except the frangible pin. I am aware that it is not original with me to provide a pin adapted to break under excessive strain to prevent injury to other parts, and I am claiming no such broad novelty. The organization of parts however in which the frangible pin or its equivalent forms an important element, constitutes the principal subject matter of my invention.

From the foregoing, taken in connection with the accompanying drawings, it will be obvious that although my invention is of comparatively simple and inexpensive nature, it will be highly efficient and in every way desirable. Since probably the best results are obtained from the several details shown and described, they are by preference followed, but within the scope of the invention as claimed, considerable latitude is allowed for making such changes as occasion may dictate. Also, it will be understood that the tractor plows of this application may be attached to all makes of tractors.

I claim:

1. In combination, a portable frame, a plow having a forwardly extending beam, a frangible connection between said beam and frame, means on said frame for retaining said beam in operative position, said retaining means being slidable forwardly from engagement with said beam upon breakage of said frangible connection, and means for raising and lowering said retaining means to similarly move said plow beam.

2. In combination, a portable frame, a plow having a forwardly extending beam, a frangible connection between said beam and frame, means on said frame for retaining said beam in operative position, said retaining means being slidable forwardly from engagement with said beam upon breakage of said frangible connection, and means for adjusting said beam laterally with respect to said frame and said retaining means.

3. In combination, a portable frame, a plow having a forwardly extending beam, a frangible connection between said beam and frame, means on said frame for retaining said beam in operative position, said retaining means being slidable forwardly from engagement with said beam upon breakage of said frangible connection, means for raising and lowering said retaining means to correspondingly move said plow beam, and means for adjusting said beam laterally with respect to said frame and retaining means.

4. In combination with a portable frame and a plow having a forwardly extending beam, a frangible connection between the front end of said beam and said frame, a rock shaft mounted on said frame, means for rocking said shaft, a crank arm on said shaft, and an open guide on said crank arm for retaining said beam in operative position and for raising and lowering the same, said beam having a portion received in said guide, and the latter being slidable forwardly from said portion upon breakage of said frangible connection.

5. A structure as specified in claim 4, together with means mounted on said crank arm for adjusting said beam laterally.

6. A structure as specified in claim 4, said portion of the beam consisting of an arm substantially parallel to the body of said beam and anchored at its rear end to said body, the front end of said arm being free.

7. In combination with a portable frame and plowing means provided with forwardly extending beam means, a frangible connection between the front end of said beam means and said frame, front and rear open guides carried by said frame, front and rear arms carried by said beam means and extending forwardly through said guides, said arms having free unobstructed front ends, and means for adjusting said guides vertically.

8. In combination with a portable frame and a plurality of plows having forwardly extending beams, a frangible connection between the front ends of said beams and said frame, a transverse rock shaft, crank arms on said rock shaft, open guides carried by said crank arms, arms on said beams extending forwardly through said guides and having free unobstructed front ends, a tilting bearing carried by said frame and supporting one end of said shaft, means for raising and lowering the other end of said shaft, and means for rocking said shaft.

9. In combination with a portable frame, and a plurality of plows having forwardly extending beams, laterally spaced open guides on said frame and means for adjusting them relatively in a vertical direction, an additional open guide carried by said frame and spaced forwardly from said first named guides and substantially central between them, laterally spaced arms on said beams extending forwardly through said laterally spaced guides and having free unobstructed front ends, an additional arm carried by said beams and extending forwardly through said central guide, said additional arm also having a free unobstructed front end, and a frangible connection between the front ends of said beams and said frame.

10. In combination with a portable frame and a plurality of plows having forwardly extending beams, a frangible connection between the front ends of said beams and said frame, a pair of laterally spaced open guides adjacent the rear ends of said beams, means on said frame for adjusting said guides relatively in a vertical direction, and laterally spaced arms carried by said beams, said arms extending forwardly through said guides and having free unobstructed front ends.

11. In combination with a portable frame, a plow beam extending longitudinally of said frame, a horizontal arm extending longitudinally of said beam and having its rear end rigidly secured thereto, the front end of said arm being free, an open guide through which said arm passes slidably, said guide being forwardly slidable entirely from said arm, and a completely severable connection between said beam and frame, breakage of said connection permitting said frame to move forwardly beyond said beam.

12. In combination with a portable frame, a plow beam extending longitudinally of said frame, front and rear horizontal arms extending longitudinally of said beam and having their rear ends rigidly secured thereto, the front ends of said arms being free, front and rear open guides through which said arms pass slidably, said guides being carried by said frame and being forwardly slidable entirely from said arms, and a completely severable connection between said beam and frame, breakage of said connection permitting said frame to move forwardly beyond said beam.

In testimony whereof I have hereunto set my hand.

JOHN NATTERSTADE.